United States Patent
Umino et al.

(10) Patent No.: US 6,585,807 B2
(45) Date of Patent: Jul. 1, 2003

(54) RECOVERY METHOD OF AMMONIA FROM GASEOUS MIXTURE

(75) Inventors: Hiroshi Umino, Oarai-machi (JP); Nobuyasu Chikamatsu, Oarai-machi (JP); Hirofumi Ito, Oarai-machi (JP); Masamichi Mizukami, Wadai Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/844,678

(22) Filed: Apr. 30, 2001

(65) Prior Publication Data

US 2002/0002905 A1 Jan. 10, 2002

(30) Foreign Application Priority Data

Apr. 28, 2000 (JP) .................................... 2000-130226

(51) Int. Cl.⁷ ............................................... B01D 53/14
(52) U.S. Cl. .............................. 95/178; 95/179; 95/193; 95/232
(58) Field of Search .......................... 95/178, 179, 180, 95/193, 194, 232

(56) References Cited

U.S. PATENT DOCUMENTS

| 2,500,291 A | * | 3/1950 | Liebel et al. |
| 2,808,125 A | * | 10/1957 | Buck et al. |
| 3,107,149 A | | 10/1963 | Wentworth et al. |
| 3,607,047 A | * | 9/1971 | Broom et al. |
| 3,985,863 A | | 10/1976 | Rice et al. |
| 4,013,431 A | * | 3/1977 | Berkel et al. |
| 4,060,591 A | * | 11/1977 | Garber et al. |
| 4,120,667 A | * | 10/1978 | Gettert et al. |
| 4,251,235 A | * | 2/1981 | Biermans |
| 4,256,471 A | * | 3/1981 | Goorden |
| 2002/0002905 A1 | * | 1/2002 | Umino et al. |

FOREIGN PATENT DOCUMENTS

| DE | 1 643 722 A | 6/1971 |
| EP | 0 581 131 A3 | 2/1994 |
| EP | 0 581 131 A2 | 2/1994 |
| JP | 61-8013 | 3/1986 |
| JP | 6-115928 | 4/1994 |

OTHER PUBLICATIONS

Patent Abstracts of Japan. JP 6–115928. Apr. 26, 1994.
Ozaki, et al., "Separating an acidic gas from an acidic gas containing ammonia", Chemical Abstracts Service XP–02226447, JP 48 023270 B, Jul. 12, 1973.

* cited by examiner

Primary Examiner—Duane S. Smith
(74) Attorney, Agent, or Firm—Sughrue Mion, PLLC

(57) ABSTRACT

An object of the present invention is to carry out separation recovery of ammonia efficiently from a gaseous mixture containing ammonia and carbon dioxide, without generating a solid ammonium carbamate. A recovery method of ammonia from a gaseous mixture, includes a process (I) in which a gaseous mixture containing ammonia and carbon dioxide is contacted with an organic solvent to allow the organic solvent to absorb ammonia in the gaseous mixture, and a process (II) in which the organic solvent which absorbed ammonia is distilled to separate ammonia from the organic solvent.

9 Claims, 2 Drawing Sheets

RECOVERY METHOD OF AMMONIA FROM GASEOUS MIXTURE

FIELD OF THE INVENTION

This invention relates to the recovery method of ammonia from a gaseous mixture containing ammonia and carbon dioxide.

BACKGROUND OF THE INVENTION

A gaseous mixture containing ammonia and carbon dioxide, is generated in a process in which dialkyl carbonate is produced from urea and an aliphatic alcohol, and a process in which urea is synthesized from ammonia and carbon dioxide.

For example, in the process where dialkyl carbonate is synthesized from urea and an aliphatic alcohol, water contained in urea as a raw material reacts with urea to generate ammonia and carbon dioxide, and to generate the gaseous mixture in which ammonia carbon dioxide and the vapor of an aliphatic alcohol are contained. And, in order to recover ammonia from such gaseous mixture, it is necessary to separate carbon dioxide and the accompanying aliphatic alcohol from the gaseous mixture.

In addition, for example, when synthesizing urea from ammonia and carbon dioxide, the gaseous mixture containing unreacted ammonia and unreacted carbon dioxide is exhausted. And to recover ammonia from this gaseous mixture, it is necessary to separate out carbon dioxide.

However, under a temperature less than 50° C. at atmospheric pressure, the ammonia and carbon dioxide in the gaseous mixture react and generate a solid ammonium carbamate. For this reason, ammonium carbamate is deposited on the surface in an apparatus, and causes problems of reducing the efficiency of the processing, or causing a blockade of the piping.

Furthermore, when ammonia is recovered from the gaseous mixture containing ammonia, there is a problem that the amount of ammonia recovered from a gas component is reduced as a result of the formation of ammonium carbamate.

Moreover, since ammonium carbamate is a solid when it is generated, there is a problem that the recovery operation becomes complicated because it cannot be dealt with as a fluid.

In order to solve such problems, JP-B-61-8013 discloses separating ammonia as a gas when the solubility of ammonia became superfluous (the term "JP-B" as used herein means an "examined Japanese publication") by absorbing the gaseous mixture containing ammonia and carbon dioxide with a solvent, and heating the solution in a temperature range from which the solubility of carbon dioxide does not become superfluous.

However, in this method, it is necessary to circulate a large quantity of solvent in order to be able to make use of the change in saturation solubility of ammonia in the solvent by changing the temperature. In addition, a lot of energy is required for cooling and for heating of the solvent which absorbed ammonia, and to reuse it.

Furthermore, when a gaseous mixture contains organic compounds, such as an alcohol, the organic compounds can not be separated only by such a process, and another facility is needed, or there is a problem that separation itself is difficult.

In JP-A-6-115928 (the term "JP-A" as used herein means an "unexamined published Japanese patent application"), a method in which ammonia is recovered from an exhaust gas containing ammonia, carbon dioxide, and an organic compound is proposed. Under conditions where an ammonium carbamate does not generate, removing the carbon dioxide from an exhaust gas as sodium carbonate is proposed by washing the gas in sodium hydroxide aqueous solution.

However, in this method, a lot of chemicals and energy are needed for processing since alkali-salt aqueous solution, such as sodium carbonate, was produced so much. As a result, a large amount of facility cost and running cost are required.

Conventionally, as a method of recovering ammonia from a gas containing ammonia and carbon dioxide, the process as shown in the flow diagram of FIG. 2 is adopted industrially. That is, in the method shown in FIG. 2, the gaseous mixture containing ammonia and carbon dioxide is supplied to a carbon dioxide absorption tower 31 through a line 51. It is washed by a sodium hydroxide aqueous solution introduced from a line 57, and the carbon dioxide in a gaseous mixture is absorbed by sodium hydroxide aqueous solution to form a sodium carbonate.

A mixed aqueous solution of sodium hydroxide and sodium carbonate is extracted from the bottom of the tower of a carbon dioxide absorption tower 31 and introduced into a stirring tub 34 through a line 53 and a line 58.

Hydrochloric acid is supplied to a stirring tub 34, and the remaining sodium hydroxide is neutralized and discharged from a line 59 as a drain.

On the other hand, the gas in which ammonia concentration is increased is obtained from the top of the tower of a carbon dioxide absorption tower 31 through the line 52, which is concentrated in a multi-stage process to obtain liquefied ammonia from a line 66.

However, in such method, concentration of ammonia is required a multi-stage process, and resulted in a problem that a large amount of facility and energy were needed.

Moreover, since it is necessary to use an alkali solution in a large amount and to use an acid solution for neutralization in a large amount, there was a problem that many chemicals were needed for discharge of carbon dioxide.

For this reason, a method of separating ammonia efficiently from the gaseous mixture containing ammonia and carbon dioxide, without generating an ammonium carbamate was strongly desired.

SUMMARY OF THE INVENTION

The present invention is directed to a method of carrying out recovery of the ammonia efficiently from the gaseous mixture containing ammonia and carbon dioxide, without generating a solid ammonium carbamate.

The ammonia recovery method from a gaseous mixture of the present invention comprises a process (I) in which the gaseous mixture containing ammonia and carbon dioxide is contacted with an organic solvent to allow the organic solvent absorb the ammonia in the gaseous mixture, and a process (II) in which the organic solvent which absorbed ammonia is distilled to separate ammonia from the organic solvent.

In the present invention, in the above-mentioned process (I), it is desirable to reuse the organic solvent separated in the above-mentioned process (II).

In addition, it is also desirable that the organic solvent of the present invention is one or more organic solvents selected from the group consisting of an alcohol, ether, ketone, ester, and a halogenated hydrocarbon. It is more desirable that the organic solvent is an alcohol, and it is still more desirable that it is an aliphatic alcohol having carbon numbers of 3 to 6.

Furthermore, it is desirable that the gaseous mixture of the present invention is a mixture containing ammonia, carbon dioxide, and an alcohol, and that the gaseous mixture is an exhaust gas produced in a process in which urea and an alcohol are reacted.

In the case of the gaseous mixture of the present invention contains an alcohol, the organic solvent uses the present invention is preferably the same.

DESCRIPTION OF THE PREFERRED EMBODIMENTS

Figure 1:
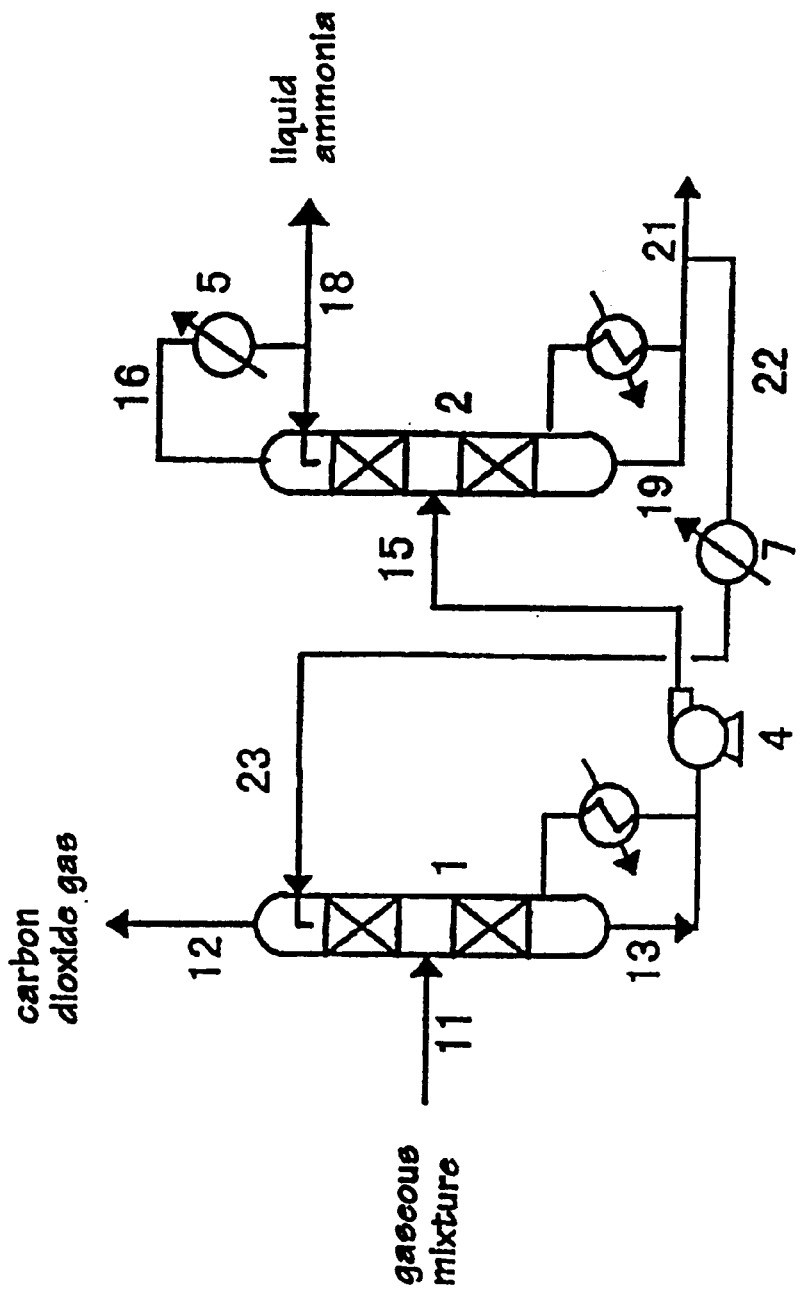
FIG. 1 is a schematic diagram showing the process of Examples 1 and 2.
Figure 2:
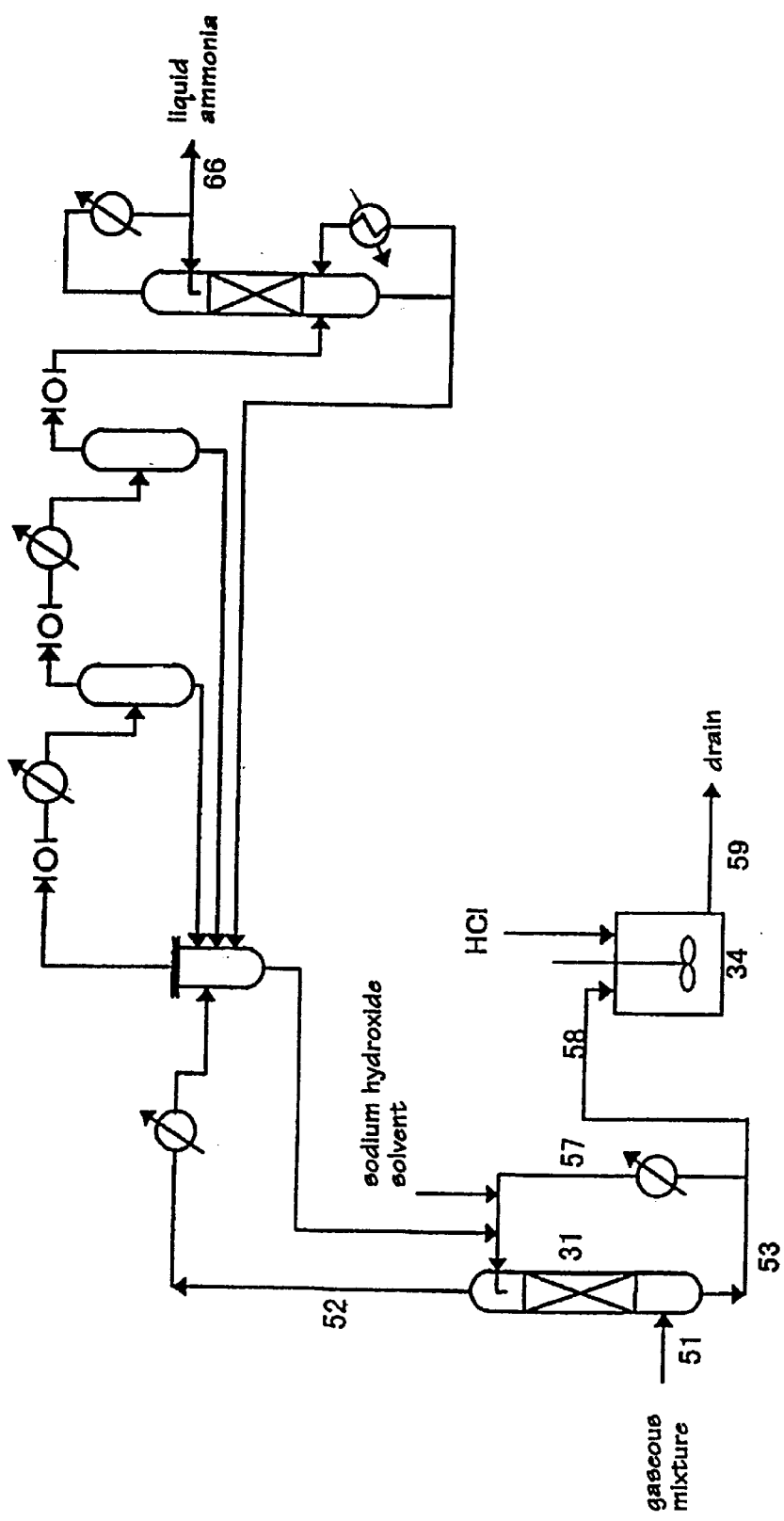
FIG. 2 is a schematic diagram showing a conventional ammonia recovery technique.

The present invention is explained in detail below.

In the ammonia recovery method from a gaseous mixture of the present invention, the process (hereinafter referred to as "Process (I)"), which allows an organic solvent absorb the gaseous mixture containing ammonia and carbon dioxide, is first performed.

In the present invention, the gaseous mixture, which is a raw material, may consist only of ammonia and carbon dioxide, or may contain ammonia, carbon dioxide, and other components.

Components other than ammonia and carbon dioxide that may constitute the gaseous mixture are nitrogen, hydrogen, oxygen, inert gas, and gaseous organic compounds, such as an alcohol, etc.

Accordingly, the gaseous mixture containing ammonia and carbon dioxide or containing ammonia, carbon dioxide, and an alcohol can be used.

When a gaseous mixture contains ammonia, carbon dioxide, and an alcohol, it is preferable that the alcohol is an aliphatic alcohol having carbon numbers of 3 to 6.

Although a gaseous mixture is not specifically limited, it may be an exhaust gas containing ammonia and carbon dioxide produced when dialkyl carbonate is manufactured from urea and an aliphatic alcohol, or when urea is synthesized from ammonia and carbon dioxide, for example.

Among these, it is preferable that the exhaust gas is produced in the process in which urea and an alcohol are reacted.

The gaseous mixture which is a raw material and organic solvent are contacted, and the ammonia in a gaseous mixture is absorbed by the organic solvent in Process (I).

An organic solvent, which is liquid under certain conditions, can be used.

The organic solvent has a boiling point of 60–300° C., and preferably 80–170° C.

Moreover, it is preferable that the solubility difference between ammonia and carbon dioxide against the organic solvent is large, and it is also preferable that the organic solvent is the liquid which can absorb a lot of ammonia.

It is desirable that the organic solvent is one or more selected from the group consisting of an alcohol, ether, ketone, ester, and a halogenated hydrocarbon.

Among these, an alcohol is more preferred. An aliphatic alcohol having a carbon numbers of 3 to 6 is more preferred from the viewpoint of balance between the solubility of ammonia and the boiling point of the aliphatic alcohol. It is especially desirable that the organic solvent is an aliphatic alcohol having a carbon number of 4 or 5. The organic solvent may be used alone or in combination with one or more organic solvents.

In addition, it is also desirable to reuse the organic solvent separated in a process (II) (process in which the organic solvent which absorbed ammonia is distilled to separate ammonia from the organic solvent and hereinafter referred to as "Process (II)") mentioned later.

When the organic solvent separated in Process (II) is reused, there are low amounts of the organic solvent used in the entire system, and therefore economical and desirable.

In Process (I), the solubility of ammonia becomes larger, as temperature is lowered, and as pressure is increased. Although ammonia can be dissolved efficiently and the amount of an organic solvent can be reduced, when the temperature becomes less than 50° C. at an atmospheric pressure, it is not desirable since ammonia and carbon dioxide in a gaseous mixture may react to form ammonium carbamate.

For this reason, it is preferably desirable for the gaseous mixture to be supplied to Process (I) at a temperature of 50° C. or more, preferably at 50–200° C.

Therefore, in Process (I), the gaseous mixture containing ammonia and carbon dioxide is contacted with an organic solvent at a temperature of 50° C. or more, preferably at 50–200° C., and more preferably at 50–100° C.

In addition, when using an ammonia absorption tower in Process (I), it is desirable for the pressure of the top of the tower to be about 0.5–6 atmospheric pressures, and preferably 0.8 to 3 atmospheric pressure.

In the gas obtained from the top of the tower in Process (I), since a large portion of ammonia in the gaseous mixture is absorbed by the organic solvent, a gas which hardly contains ammonia and including a large portion of carbon dioxide is obtained.

Moreover, when the gas contains gaseous organic substances, such as an alcohol, ether, ketone, ester, and a halogenated hydrocarbon, it is also desirable to use the organic solvent, which consists of this gaseous organic solvent as an organic solvent, which absorbs ammonia.

When the same kind of organic solvent which is contained in a gaseous mixture are used, recovery and reuse of an organic solvent are performed especially smoothly in the entire system, which recovers ammonia from the gaseous mixture, since there is no mixing of a new impurity and further separation processing, etc. is not needed afterwards, which is desirable.

Then, in Process (II), the organic solvent which absorbed the ammonia obtained in the above-mentioned Process (I) is distilled, and it separates into ammonia and an organic solvent.

In the present invention, since a large portion of carbon dioxide in the gaseous mixture is already separated in the above-mentioned Process (I), the ammonia obtained in Process (II) by distillation hardly contains carbon dioxide.

When the organic solution, which absorbed ammonia, is pressurized with a pump and introduced into Process (II), the inside of the ammonia separation tower can be easily made into a pressured condition, and it can be adjusted to a condition with certain temperature and pressure, in which the evaporated ammonia liquefies easily in the top of the tower.

Although whole-quantity recovery of the organic solvent according to Process (II) can also be carried out, it is desirable to reuse the organic solvent in the above-mentioned Process (I), as discussed above.

When carrying out the reuse of the separated organic solvent, the amount of the organic solvent used, which is a supply component, can be reduced, and since there is little heating energy of an organic solvent, ammonia can be recovered economically.

As a result, compared with the conventional method, the facility used for recovery of ammonia can be greatly reduced.

Moreover, the ammonia absorption tower can be considered as being divided into two towers in the above-mentioned Process (I). In the tower of the preceding stage (absorption tower), almost the whole quantity of ammonia and a part of carbon dioxide are absorbed and carbon dioxide gas is discharged from the top of the tower. And in the tower of the latter stage (diffusion tower), carbon dioxide is separated from the top of the tower accompanying a part of ammonia, and the gas from this top of the tower is returned to the tower of the preceding stage.

Furthermore, in the above-mentioned Process (II), the ammonia separation tower can be considered as being divided into two towers. Alcohols, etc., are recovered from the bottom of the tower of the preceding stage, then the mixture of ammonia obtained from the top of the tower of the preceding stage and an alcohol is introduced into the latter tower, and further ammonia is recovered from the top of the latter tower. Then, the liquid of the bottom of the latter tower can be returned to the tower of the preceding stage. At this stage, by making the pressure in the latter tower higher than the pressure of the tower of the preceding stage, the temperature of the top of the tower of the latter tower (boiling point of ammonia) can be raised, and the temperature of the bottom of the tower of the preceding stage (boiling point of an alcohol) can be lowered. Accordingly, operating conditions that are more moderate can also be chosen.

An embodiment of the present invention is explained with reference to FIG. 1. From a line 11, the gaseous mixture, which is a raw material, is introduced into an ammonia absorption tower 1, and Process (I) can be performed.

In the ammonia absorption tower 1, the organic solvent separated at Process (II) performed in the ammonia separation tower 2, mentioned later, is supplied into an ammonia absorption tower 1 through a line 23.

In the ammonia absorption tower 1, the organic solvent flowing down and the gaseous mixture come into contact, and the organic solvent absorbs the ammonia in the gaseous mixture. Here, the organic solvent supplied to the ammonia absorption tower 1 may be only the organic solvent separated at Process (II) that is re-supplied. Or a part of the organic solvent may be new organic solvent, or the entire quantity may be organic solvent that is newly supplied. It is economical for the organic solvent separated in Process (II) to be used, and it is desirable as shown in FIG. 1.

The gas which hardly contains ammonia and includes a large portion of carbon dioxide in the gaseous mixture is obtained from the line 12 at the top-of-tower part of the ammonia absorption tower 1. On the other hand, the organic solvent, which absorbed a large portion of ammonia in the gaseous mixture, is obtained from the line 13 of the bottom of the tower of the ammonia absorption tower 1.

Most organic solvents obtained from the line 13 are supplied to an ammonia separation tower 2 through a pump 4 and a line 15. The organic solvent, which absorbed ammonia, is distilled, and Process (II) dividing ammonia and an organic solvent is performed.

In the ammonia separation tower 2, the organic solvent, which absorbed the ammonia, supplied through the line 15 is distilled. The ammonia separated from the organic solvent is obtained through the line i6 from a top-of-tower part, and cooled with a cooler 5. Liquid ammonia is obtained from a line 18.

Moreover, the separated organic solvent is obtained from the bottom-of-tower part of the ammonia separation tower 2 through a line 19. The organic solvent obtained through the line 19 and the line 22 is re-supplied to an ammonia absorption tower 1 through a line 23 as an organic solvent to be used in Process (I) for absorbing the ammonia in a raw material gaseous mixture, after cooling, if needed.

Furthermore, the organic solvent which was separated by Process (II) in the ammonia separation tower 2 and was obtained through the line 19 is acquirable through the line 21. Especially when the same component as an organic solvent is contained in the gaseous mixture, since the organic solvent supplied to the ammonia separation tower (I) through line 23 became superfluous, and the organic solvent of the amount equivalent to the gaseous mixture origin can be obtained from a line 21.

Furthermore, it is also possible, by carrying out a heat exchange between lines 15 and line 22, to gather energy efficiently.

According to the present invention, an ammonium carbamate is not generated. Further, since there is also almost no ammonia, which accompanies carbon dioxide and is discharged, there is little loss of ammonia, and therefore ammonia can be collected with a high yield.

According to the present invention, ammonia can be collected with a high yield according to the process, which is simplified more than before, without generating an ammonium carbamate. Moreover, when carrying out the reuse of the separated organic solvent, ammonia is economically recoverable since there is little amount of organic solvent used which as a supply component, and since there is little heating energy required.

Furthermore, when the gaseous mixture contains the same alcohol which is used as an organic solvent in this process, there is no mixing of a new impurity into a system. Thus, it is not necessary to separate a new impurity from the obtained separation component, and the alcohols in the gaseous-like mixture can be collected efficiently.

EXAMPLES

The present invention is explained in more detail by way of examples; however, the present invention is not intended to be limited in scope by these examples.

The examples are explained with reference to FIG. 1.

Example 1

An 80° C. gaseous-ike mixture, which consists of 50% of weight of ammonia, 1% of weight of carbon dioxide, and 49% of weight of n-butanol, was introduced into an ammonia absorption tower 1 at 28.0 kg/h through a line 11. A 60° C. n-butanol containing 10 ppm by weight of ammonia was flowed down from the top-of-tower part in an amount of 36 times in terms of the weight ratio to the amount of the gaseous mixture introduced as the absorption solvent.

An ammonia absorption tower 1 is a tower filled with the Pall ring of eight steps of theoretical plate numbers.

The top-of-tower pressure was set to 1.1 atmospheric pressure, and the bottom of tower was heated so that the bottom-of-tower temperature became 86° C.

The gas containing 88 weight % of carbon dioxide, 12 weight % of n-butanol, and 10 ppm by weight of ammonia was obtained from the top-of-tower part of the ammonia absorption tower 1 through the line 12.

N-butanol solution whose carbon dioxide content is below 1 ppm by weight and containing 1.4 weight % ammonia was obtained from the bottom-of-tower part of the ammonia absorption tower 1 through the line 13.

Subsequently, n-butanol solution containing the ammonia obtained through the line 13 was pressurized with a pump 4 through line 15, and was introduced into the ammonia separation tower 2.

The ammonia separation tower 2 was a tower filled with the Pall ring of 14 steps of theoretical plate numbers. The bottom of tower was heated to 191° C., and the top of tower was cooled, and set to a pressure of 7.4 atmospheric pressure. The temperature of a reflux drum (not shown) was 15° C. In the ammonia separation tower 2, the ammonia vapor was obtained from the top-of-tower part from the line 16, and liquid ammonia was obtained at 14.0 kg/h from the line 18 through the cooler 5 and the reflux drum.

Moreover, from the bottom-of-tower part of the ammonia separation tower 2, n-butanol, which contains 10 ppm by weight of ammonia, was obtained through a line 19 at 1022 kg/h, and cooled at 1008 kg/h to 60° C. through line 22 and cooler 7, was introduced into the ammonia absorption tower 1 through a line 23 and 13.7 kg/h of n-butanol equivalent to a part of the original gaseous mixture was recovered through the line 21.

Example 2

A 75° C. gaseous mixture, which consists of 98-weight % of ammonia and 2 weight % of carbon dioxide, was introduced into the ammonia absorption tower 1 at 14.0 kg/h through the line 11 using the same equipment as in Example 1. Flowing down of the organic solvent from the top-of-tower part was carried out in an amount of 85 times in terms of the weight ratio to the amount of to the introduced gaseous mixture, and 60° C. n-pentanol containing 6 ppm by weight of ammonia was used as the absorption solvent.

The bottom of tower of the ammonia absorption tower 1 was heated so that the temperature of the bottom-of-tower became 90° C. The carbon dioxide gas containing 400 ppm by weight of ammonia was obtained from the top-of-tower part of the ammonia absorption tower 1 through the line 12, and n-pentanol solution, which includes 1.1 weight % ammonia and carbon dioxide in an amount of 1 ppm by weight or less, was obtained from the bottom-of-tower part of the ammonia absorption tower 1 through the line 13.

Subsequently, n-pentanol solution containing ammonia obtained through the line 13 was pressurized with a pump 4, and introduced into the ammonia separation tower 2 through the line 15.

In the ammonia separation tower 2, the bottom of tower was heated to 203° C., and the top of tower was cooled, and set at a pressure of 5.8 atmospheric pressure. A reflux drum (not shown) had a temperature of 8° C. In the ammonia separation the tower 2, the ammonia vapor was obtained from the top-of-tower part through the line 16, and liquid ammonia was obtained from the line 18 at 13.7 kg/h through the cooler 5 and the reflux drum.

In addition, from the bottom-of-tower part of the ammonia separation tower 2, n-pentanol, which contains 6 ppm by weight of ammonia, was obtained through a line 19 at 1190 kg/h. This n-pentanol was cooled to 60° C. through the line 22 and the cooler 7, and introduced into the ammonia absorption tower 1 through the line 23.

While the invention has been described in detail and with reference to specific embodiments thereof, it will be apparent to one skilled in the art that various changes and modifications can be made therein without departing from the spirit and scope thereof.

What is claimed is:

1. A recovery method of ammonia from a gaseous mixture, comprising a process (I) in which a gaseous mixture comprising ammonia and carbon dioxide is contacted with an organic solvent selected from the group consisting of alcohol, ether, ketone, ester, and halogenated hydrocarbon to allow said organic solvent to absorb ammonia, and a process (II) in which said organic solvent which absorbed ammonia is distilled to separate ammonia from said organic solvent.

2. The recovery method of ammonia from a gaseous mixture according to claim 1, wherein said organic solvent separated from ammonia in the process (II) is reused in the contacting step in the process (I).

3. The recovery method of ammonia from a gaseous mixture according to claims 1 or 2, wherein said gaseous mixture is contacted to organic solvent at a temperature of 50° C. or more in the process (I).

4. The recovery method of ammonia from a gaseous mixture according to claim 1 or 2, wherein said organic solvent is alcohol.

5. The recovery method of ammonia from a gaseous mixture according to claim 4, wherein said alcohol is aliphatic alcohol having a carbon number of 3 to 6.

6. The recovery method of ammonia from a gaseous mixture according to claim 1 or 2, wherein said gaseous mixture further comprises alcohol.

7. The recovery method of ammonia from a gaseous mixture according to claim 6, wherein said gaseous mixture is an exhaust gas from the reaction of urea and alcohol.

8. The recovery method of ammonia from a gaseous mixture according to claim 6, wherein said organic solvent is an alcohol, which is contained in said gaseous mixture.

9. The recovery method of ammonia from a gaseous mixture according to claim 7, wherein said organic solvent is an alcohol, which is contained in said gaseous mixture.

* * * * *